Jan. 6, 1959
P. B. MURRAY
2,867,677
DEHYDROGENATION OF HYDROCARBONS
Filed May 15, 1956
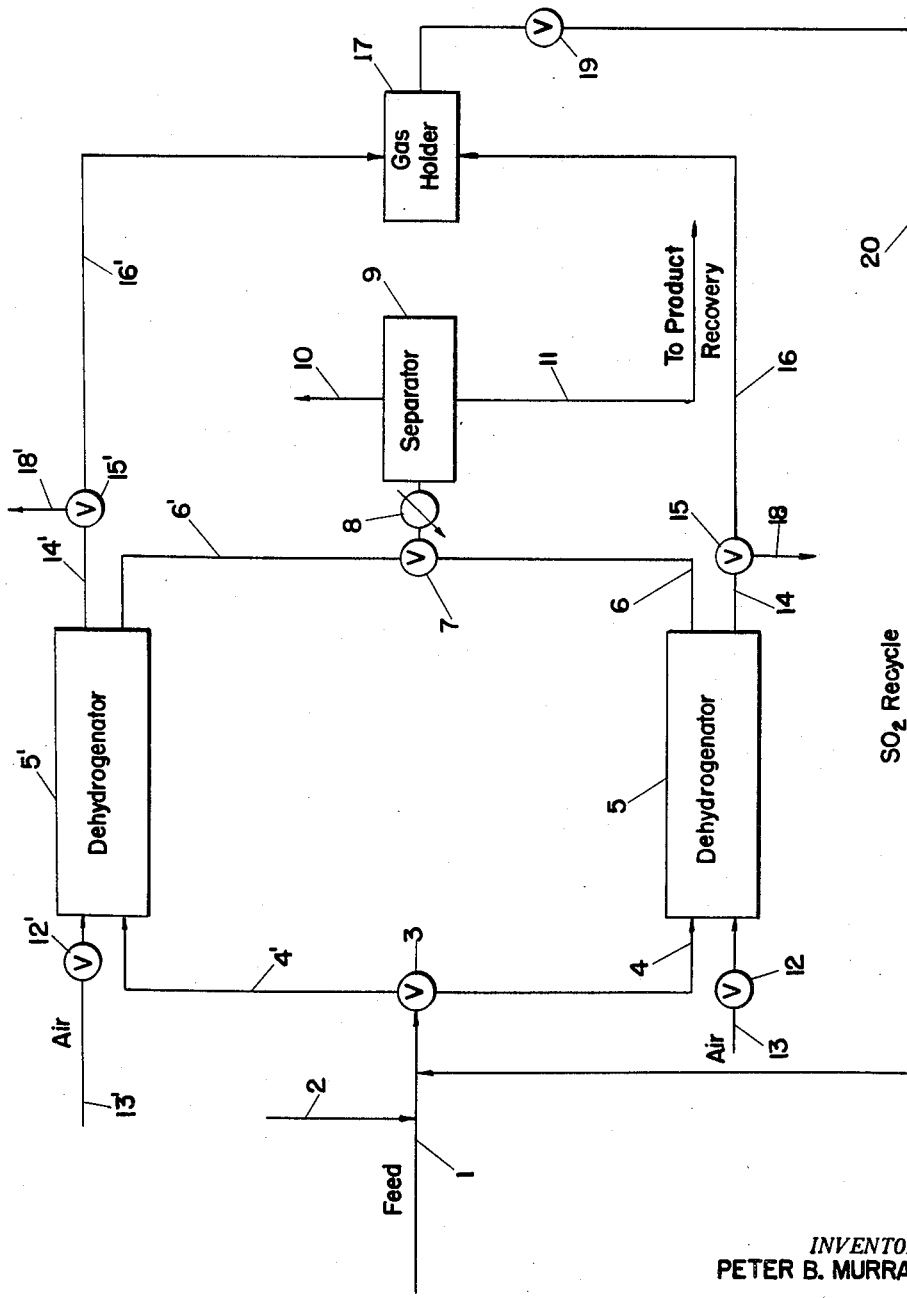
INVENTOR.
PETER B. MURRAY
BY
ATTORNEY

2,867,677
DEHYDROGENATION OF HYDROCARBONS

Peter B. Murray, Swarthmore, Pa., assignor to Sun Oil Company, Philadelphia, Pa., a corporation of New Jersey Application May 15, 1956, Serial No. 584,989

1 Claim. (Cl. 260—673.5)

This invention relates to the dehydrogenation of organic compounds, and more particularly to a dehydrogenation process in which sulfur dioxide is used as a hydrogen acceptor.

Processes for the catalytic dehydrogenation and aromatization of various hydrocarbon fractions with the aid of $SO_2$ as a hydrogen acceptor and in the presence of catalysts such as fuller's earth, acid activated clays, bentonite, bauxite, silica gel, activated charcoal and chromia-alumina have been known to the art. The $SO_2$ reacts with hydrogen liberated in the dehydrogenation reaction in order to remove it from the reaction mixture, and thus shift the equilibrium towards the production of olefins. Another advantage is that $SO_2$ reacts exothermically and the heat so liberated will counterbalance loss of heat to the endothermic dehydrogenation reaction to maintain the reaction mixture at reaction temperatures.

In these processes, the feed, in admixture with $SO_2$ is passed over the catalyst at dehydrogenation temperatures, and a product is recovered comprising compounds of greater unsaturation than the feed, hydrogen sulfide, small amounts of free sulfur, and, in case the feed comprises paraffins, small amounts of organic sulfur compounds. In addition, some of the hydrocarbons will decompose or polymerize to form carbonaceous deposits on the catalyst.

While the exact mechanism of the reactions occurring insofar as sulphur is concerned is not fully understood, the over-all reaction may be represented in simplified form by the following equations:

(1) 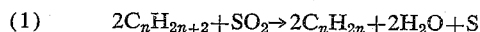
$$2C_nH_{2n+2} + SO_2 \rightarrow 2C_nH_{2n} + 2H_2O + S$$

(2) 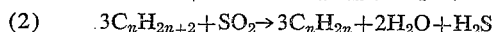
$$3C_nH_{2n+2} + SO_2 \rightarrow 3C_nH_{2n} + 2H_2O + H_2S$$

(3) 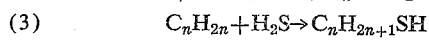
$$C_nH_{2n} + H_2S \rightarrow C_nH_{2n+1}SH$$

In addition to the simple mercaptan formation illustrated in Equation 3, other complex reactions may take place to yield sulfides, disulfides, thioethers, thiophene and its homologues, and carbon disulfide. The organic sulfur compounds formed present a considerable problem in refining the product to obtain sulfur-free olefins.

The hydrogen sulfide produced in the process may be recovered and re-oxidized to $SO_2$ for recycle to the process, but the free sulfur and organically combined sulfur cannot be economically recovered as $SO_2$ so that fresh $SO_2$ from a source outside the process must be continuously added.

It is an object of this invention to provide a process for the dehydrogenation of dehydrogenatable hydrocarbons with the aid of $SO_2$ in which formation of organic sulfur compounds and free sulfur is inhibited.

It is a further object of this invention to recover $SO_2$ for recycle to the process without the intervention of the steps of recovering hydrogen sulfide and oxidation thereof.

I have found that the foregoing desirable objects may be attained by conducting the dehydrogenation reaction in the presence of a metal oxide which is a dehydrogenation catalyst, and which is reactive with sulfur or hydrogen sulfide to form a sulfide which also is active to promote dehydrogenation, such as molybdenum, cobalt, or tungsten oxides. Preferably the catalysts are distended upon a support such as alumina, alumina-silica, silica gel, or clay. In the practice of the process, the hydrocarbon or hydrocarbons to be dehydrogenated are mixed with $SO_2$ in a mol ratio of hydrocarbon to $SO_2$ from about 10:1 to about 1:1, and the mixture is passed over the catalyst in a first reactor at a temperature of from about 900° F. to about 1200° F. until the oxide has been substantially completely converted to sulfide by reaction with free sulfur or hydrogen sulfide produced in accordance with Equations 1 and 2. The feed is then switched to another reactor while air or other oxygen-containing gas is passed over the catalyst in the first reactor in order to burn off sulfur and coke.

During the first part of the regeneration cycle, the off-gases will contain nitrogen and $SO_2$ together with minor amounts of carbon oxides, and will be essentially oxygen-free. These gases are recycled to the dehydrogenation stage of the process to provide the $SO_2$ required to remove hydrogen from the reaction products. After all the sulfur has been burned off the catalyst, as evidenced by the absence of $SO_2$ in the off-gases, passage of air over the catalyst is continued until all coke has been burned off, the off-gases during this portion of the cycle being vented to the atmosphere. The catalyst is then purged of oxygen by passing an inert gas, such as oxygen-free flue gas, through it, after which passage of hydrocarbon feed and $SO_2$ to the catalyst is recommenced. By proceeding in the foregoing manner, it will be found that a high yield of olefins per pass will be obtained, the dehydrogenated product will be sulfur-free, and no separate equipment for the recovery and re-oxidation of hydrogen sulfide will be required.

In order that those skilled in the art may more fully appreciate the nature of my process and the method of carrying it out, it will be more fully described in connection with the accompanying drawing, which is a diagrammatic flow sheet of the process.

In starting up the process, a dehydrogenatable hydrocarbon feed, such as ethane, propane, butane, n-butene, ethyl benzene or a mixture of hydrocarbons such as straight-run petroleum naphtha, is taken through line 1 and is mixed with a gas comprising $SO_2$, introduced from an extraneous source through line 2, in such proportion that the molar proportion of $SO_2$ to hydrocarbon is from about 1:10 to 1:1. The mixture is then taken through valve 3 and line 4 to dehydrogenation reactor 5 in which it is contacted with a catalyst comprising molybdena, cobalt oxide, or tungsten oxide, or mixtures thereof, at a temperature favoring dehydrogenation of the hydrocarbon component of the feed. The optimum temperature will vary with the nature of the hydrocarbon being treated, but will generally be in the range of 850–1200° F., and preferably from 900–1050° F.

In reactor 5 the hydrocarbons will be dehydrogenated, and the hydrogen liberated in the reaction will react with the $SO_2$ present to form $H_2S$ or elemental sulfur, which will in turn react with the catalyst to convert the oxide to the sulfide. Products of the reaction are taken through line 6, valve 7 and condenser 8, and are passed to liquid-vapor separator 9. Any uncondensible material produced in the reaction, or introduced into the process along with the feed, is removed through line 10, while sulfur-free liquid products are taken through line 11 for further processing to separate products of dehydrogenation from unreacted feed components, or, if the feed was a straight-run naphtha, for blending with other gasoline components.

Operation is continued in this manner until the catalyst has been substantially converted to sulfide, at which time valve 3 is switched to send the feed through line 4 to dehydrogenation reactor 5', in which dehydrogenation is carried out in the same manner as in dehydrogenation reactor 5. Valve 7 is also switched to allow reaction products to pass through line 6' and condenser 8 to separator 9.

Valve 12 is now opened, and air, or other oxygen-containing gas is passed through line 13 to reactor 5, in which the oxygen will react with the sulfided catalyst to reconvert it to the oxide. An oxygen-free gas comprising $SO_2$ is taken from reactor 5 through line 14, valve 15 and line 16 to gas holder 17. When $SO_2$ ceases to appear in the gases from reactor 5, valve 15 is switched to vent the off-gases to the atmosphere through line 18. Passage of air through reactor 5 will be continued until all carbonaceous deposits have been removed from the catalyst, at which time an inert gas will be introduced into reactor 5 through line 13 in an amount sufficient to sweep all oxygen out of the reactor.

Valves 12 and 15 will then be closed, and valves 3 and 7 will be switched to again send feed through reactor 5. Addition of $SO_2$ through line 2 will now be stopped, the $SO_2$ required for the reaction being obtained by opening valve 19 to pass gas from gas holder 17 through line 20 to admixture with the incoming hydrocarbon feed. The nitrogen present in the gases introduced via line 20 will be vented through line 10 so that no build-up of nitrogen in the system takes place. Operation will be continued until the catalyst in reactor 5 is substantially sulfided, after which it will be regenerated as hereinbefore described. While reactor 5 is on stream in the dehydrogenation portion of the cycle, the catalyst in reactor 5' will be regenerated by passing air through valve 12' and line 13' to the reactor, while $SO_2$ containing off-gases are passed through line 14', valve 15', and line 16' to gas holder 17. Off-gases free of $SO_2$ will be vented through line 18'.

As may be observed from the foregoing description, the present invention provides a process for dehydrogenating hydrocarbons with the aid of $SO_2$ in which contamination of the products with sulfur is avoided, and in which $SO_2$ is recovered directly for recycle to the process, without the necessity of providing any facilities for the separation of other sulfur compounds for re-oxidation to $SO_2$. An additional advantage is that the nitrogen present in the $SO_2$ recycle stream will reduce the partial pressure of the hydrocarbons in the reactor, and thus lessen coke deposition on the catalyst.

I claim:

In a process for dehydrogenating hydrocarbons which comprises admixing a dehydrogenatable hydrocarbon with sulfur dioxide to form a mixed feed in a mol ratio of hydrocarbon to sulfur dioxide of from about 10:1 to about 1:1, passing the mixed feed into contact with a catalyst selected from the group consisting of the oxides of molybdenum, cobalt, and tungsten, and mixtures thereof, at temperatures favoring dehydrogenation of the hydrocarbon for a period of time sufficient to convert a substantial portion of the catalyst to sulfide and to lay down a minor amount of a carbonaceous deposit on the catalyst, while recovering hydrocarbons of lesser saturation than the hydrocarbon component of the feed, the improvement which consists in stopping flow of the mixed feed to the catalyst, passing an oxygen-containing gas over the catalyst while reacting the oxygen with the sulfide to produce oxides and sulfur dioxide, collecting a substantially oxygen-free sulfur containing gas until substantially all sulfur has been removed from the catalyst, continuing passage of oxygen-containing gas over the catalyst until substantially all carbonaceous material has been removed from the catalyst while venting the off-gases, stopping flow of oxygen-containing gas over the catalyst, purging oxygen from the catalyst, and resuming passage of mixed feed to the catalyst, the sulfur dioxide content of the mixed feed being substantially completely supplied by recycle of the sulfur dioxide containing gas recovered in the process to admixture with the hydrocarbon component of the feed.

References Cited in the file of this patent

UNITED STATES PATENTS

| 2,390,323 | Peck | Dec. 4, 1945 |
| 2,398,175 | Cole | Apr. 9, 1946 |
| 2,423,418 | Stone et al. | July 1, 1947 |